(12) United States Patent
Cheng et al.

(10) Patent No.: US 10,222,919 B2
(45) Date of Patent: *Mar. 5, 2019

(54) CAPACITIVE TOUCH SCREEN AND SINGLE LAYER WIRING ELECTRODE ARRAY

(71) Applicant: Silead Inc., Shanghai (CN)

(72) Inventors: Taiyi Cheng, Shanghai (CN); Tianming Zhao, Shanghai (CN); Hao Tang, Shanghai (CN)

(73) Assignee: SILEAD INC., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,648

(22) Filed: May 18, 2017

(65) Prior Publication Data

US 2017/0308205 A1    Oct. 26, 2017

Related U.S. Application Data

(63) Continuation of application No. 14/415,237, filed as application No. PCT/CN2013/079555 on Jul. 17, 2013, now Pat. No. 9,678,610.

(30) Foreign Application Priority Data

Jul. 20, 2012  (CN) .......................... 2012 1 0253965

(51) Int. Cl.
  *G06F 3/044*  (2006.01)
  *G06F 1/16*   (2006.01)
  *G06F 3/041*  (2006.01)

(52) U.S. Cl.
  CPC .............. *G06F 3/044* (2013.01); *G06F 1/16* (2013.01); *G06F 3/0416* (2013.01)

(58) Field of Classification Search
  CPC ..................................................... G06F 3/041
  See application file for complete search history.

(56) References Cited

U.S. PATENT DOCUMENTS

2009/0267916 A1* 10/2009 Hotelling ................ G06F 3/044
                                                  345/174
2012/0105365 A1*  5/2012 Lin ........................ G06F 3/044
                                                  345/174

(Continued)

FOREIGN PATENT DOCUMENTS

CN      101477430       7/2009
CN      201402456      10/2010

(Continued)

OTHER PUBLICATIONS

International Search Report dated Oct. 24, 2013, Application No. PCT/CN2013/079555, 6 pages.

*Primary Examiner* — Alexander Eisen
*Assistant Examiner* — Cory A Almeida
(74) *Attorney, Agent, or Firm* — Haynes and Boone, LLP

(57) ABSTRACT

Disclosed are a capacitive touch screen and a single layer wiring electrode array. The single layer wiring electrode array includes capacitive regions and wiring regions located on one plane. Wires in the wiring regions are zigzag-shaped or wave-shaped. The capacitive touch screen includes a substrate; a single layer wiring electrode array disposed over the substrate, wherein the single layer wiring electrode array includes capacitive regions and wiring regions located on one plane and wires in the wiring region are zigzag-shaped or wave-shaped; and control ports for connecting to one or more integrated circuits, wherein the wires in the wiring regions are connected to the control ports respectively. The single layer wiring electrode array and the capacitive touch screen lower the fabrication cost and improve the display effects.

20 Claims, 6 Drawing Sheets

(56) References Cited

U.S. PATENT DOCUMENTS

2012/0262419 A1* 10/2012 Hershman ............... G06F 3/044
                                                        345/174
2015/0177878 A1   6/2015 Cheng et al.

FOREIGN PATENT DOCUMENTS

| CN | 101943975 | 1/2011 |
| CN | 102016762 | 4/2011 |
| CN | 102364414 | 2/2012 |
| CN | 202771407 | 6/2013 |
| WO | WO2014012499 | 1/2014 |

* cited by examiner

CAPACITIVE TOUCH SCREEN AND SINGLE LAYER WIRING ELECTRODE ARRAY

PRIORITY

This is a continuation of U.S. application Ser. No. 14/415,237, filed Jan. 16, 2015, which is a national phase application of Patent Cooperation Treaty Application No. PCT/CN2013/079555, filed Jul. 17, 2013, which claims priority to Chinese Application No. 201210253965.2, filed Jul. 20, 2012, the disclosures of which are incorporated herein by reference.

TECHNICAL FIELD

The present disclosure is generally related to the field of the electronics technology, and more particularly, to a single layer wiring electrode array. The present disclosure is further related to a capacitive touch screen having a single layer wiring electrode array.

BACKGROUND

Originating from high-end smart phone fields, the multi-point touch (or multi-touch) technology is now spreading to the entire customer electronics industry, including mid-end and low-end mobile phones, game consoles and systems, media players, navigation systems, e-readers, tablet computers, and the like.

Capacitive touch screens operate with charge transfer through human body. A capacitive touch screen is typically a four-layer compound glass screen. The three inner layers are composed of two transparent conductive films, such as indium-tin-oxide (ITO), and an insulating layer there between. The outermost layer of the four-layer compound is a thin layer of silica glass protection layer. The inner and outer ITO films are etched to have bar-shaped electrodes along two perpendicular axes, thereby forming meshes (sensing capacitors). When a finger touches a metal layer, a coupling capacitor is formed on the surface of the touch screen where the finger touches. For high-frequency currents, the capacitor acts as a direct conductor. Since the human body has a body-to-ground capacitance, the finger absorbs a small amount of currents from the touch point. The position of the touch point can therefore be detected by monitoring the changes of the currents of the meshes.

The core component of the projected capacitive touch screen is the glass coated with ITO films on both sides. The inner and outer ITO films of the projected capacitive touch screen do not cover the entire screen, but are made into horizontal and vertical bar patterns or diamond patterns that are staggered between the inner and outer films.

FIG. 1 illustrates a single layer electrode and a conducting circuit disclosed in Chinese Patent Application CN102033672A. It comprises a substrate 9, an electrode 10 and a conducting circuit 11. The electrode 10 is composed of multiple comb-shaped structures, in which each two adjacent comb-shaped structures intersect with each other to form the electrode. The conducting circuits 11 are vertical or horizontal lines, and are connected to the respective electrodes. One issue with such design is that, after the substrate and the LCD panel are joined, noticeable rainbow effects may appear. Such rainbow effects have adverse impact on transparency, linearity, and display effects, resulting in unstable performance of the touch screen.

Using two ITO films obviously increases both the complexity and the costs in the fabrication process, and reduces the manufacture yield.

Therefore, using a single ITO film is preferable. However, bridging among electrodes is frequently required in the fabrication process with a single ITO film. Due to differences in thickness between the insulating film and the ITO or metal film, bridges may crack. After the capacitive touch screen is affixed to the LCD, using horizontal and/or vertical straight line wire may cause color stripes, similar to the rainbow effect. This creates discomfort to human eyes and affects the image display effects.

SUMMARY

The present disclosure aims at solving the aforementioned problems by providing a single layer wiring electrode array and a capacitive touch screen. This single layer wiring electrode array and this capacitive touch screen provide simple preparation process, low costs, high touch sensing performances, and great display effects.

A single layer wiring electrode array constructed according to the present disclosure includes capacitive regions and wiring regions located on one plane, wherein wires in the wiring regions are zigzag-shaped or wave-shaped.

Preferably, the capacitive regions and the wiring regions are arranged in an alternating manner.

Preferably, the capacitive regions each include sequentially arranged capacitor cells and each capacitor cell includes at least one sensing electrode and at least one driving electrode disposed opposite to the sensing electrode on one plane.

Preferably, an inner portion of the sensing electrode may include a hole.

Preferably, an inner portion of the driving electrode may include a hole.

Preferably, the wiring regions may include driving wires connected to multiple driving electrodes in parallel and a sensing wire that connects multiple sensing electrodes in series.

Preferably, the sensing electrode has a zigzag-shaped or wave-shaped edge, the driving electrode has a zigzag-shaped or wave-shaped edge, and the two edges run parallel to each other, thereby forming a capacitor by the two electrodes.

Preferably, a plurality of sensing electrodes fit into wave-shaped or zigzag-shaped grooves formed by a plurality of driving electrodes, and the plurality of driving electrodes fit into wave-shaped or zigzag-shaped grooves formed by the plurality of sensing electrodes.

Preferably, the sensing electrodes of the capacitor cells are arranged in parallel and are connected in series through sensing wires at one side of the sensing electrodes, thereby forming a plurality of sensing electrode columns, the plurality of sensing electrode columns is arranged in parallel to form a sensing electrode plane; the driving electrodes of the capacitor cells are arranged in parallel and are connected in parallel through driving wires at one side of the driving electrodes, thereby forming a plurality of driving electrode columns, and the plurality of driving electrode columns is arranged in parallel to form a driving electrode plane.

Preferably, two adjacent turns of the sensing wire form an angle that ranges from 10° to 170°. More preferably, two adjacent turns of the sensing wire form an angle that ranges from 100° to 140°.

Preferably, two adjacent turns of the driving wire form an angle that ranges from 10° to 170°. More preferably, two adjacent turns of the driving wire form an angle that ranges from 100° to 140°.

Preferably, the sensing electrode includes zigzag-shaped or wave-shaped grooves having inner angles ranging from 10° to 170° and the driving electrode includes zigzag-shaped or wave-shaped grooves having inner angles ranging from 10° to 170°. More preferably, the sensing electrode includes zigzag-shaped or wave-shaped grooves having inner angles ranging from 100° to 140° and the driving electrode includes zigzag-shaped or wave-shaped grooves having inner angles ranging from 100° to 140°.

Preferably, a line width of the sensing wire ranges from 0.001 to 10 millimeter (mm), and a width of the sensing electrode ranges from 0.005 to 10 mm.

Preferably, a line width of the driving wire ranges from 0.001 to 10 mm, and a width of the driving electrode ranges from 0.005 to 10 mm.

Preferably, a space between adjacent driving wires ranges from 0.001 to 5.0 mm.

Preferably, a distance between the wave-shaped or zigzag-shaped edges of the sensing electrode and the adjacent driving electrode ranges from 0.001 to 5 mm.

Preferably, a length of the capacitor cell ranges from 1 to 15 mm and a width of the capacitor cell ranges from 1 to 15 mm.

Preferably, the wiring regions further include a separation wire located between the sensing wire and the driving wires. The separation wire may be wave-shaped or zigzag-shaped and is parallel to an edge of the sensing wire and an edge of one of the driving wires.

Preferably, the separation wire includes zigzag-shaped or wave-shaped grooves having inner angles ranging from 10° to 170°. More preferably, the separation wire includes zigzag-shaped or wave-shaped grooves having inner angles ranging from 40° to 140°.

Preferably, a line width of the separation wire ranges from 0.005 to 10 mm.

Preferably, a distance between an edge of the separation wire and a wave-shaped or zigzag-shaped edge of the driving wire or the sensing wire ranges from 0.001 to 10 mm.

Preferably, the sensing electrode and the driving electrode are made of a conductive film. More preferably, the sensing electrode and the driving electrode are made of an ITO film.

A capacitive touch screen constructed according to the present disclosure includes a substrate and a single layer wiring electrode array disposed over the substrate. The single layer wiring electrode array includes capacitive regions and wiring regions located on one plane and wires in the wiring regions are zigzag-shaped or wave-shaped. The capacitive touch screen further includes control ports for connecting to one or more integrated circuits (IC), wherein the wires in the wiring regions are connected to the control ports respectively.

Preferably, the capacitive touch screen further includes a ground wire connected to one of the control ports for connecting to the IC. More preferably, the ground wire may be wave-shaped or zigzag-shaped.

Preferably, the substrate is made of: glass, toughened glass, tempered glass, or polyethylene terephthalate (PET).

Preferably, the control ports for connecting to the IC are located on one end of the touch screen. More preferably, the control ports for connecting to the IC are located on opposite ends of the touch screen, a portion of the driving wires are connected to control ports at the top of the touch screen, and another portion of the driving wire are connected to control ports at the bottom of the touch screen which are routed to the IC through flexible circuit board, ITO films on the edge of the screen, or metal interconnects. This will reduce the space occupied by the driving wires, thereby reducing non-capacitive area of the wiring electrode array, improving touch sensitivity, and increasing capacitor density.

Preferably, one IC is installed; and preferably, two ICs are installed, an upper portion of the driving wires is connected to control ports corresponding to an IC, while a lower portion thereof is connected to control ports corresponding to another IC. This will reduce the space occupied by the driving wires, thereby reducing non-capacitive area of the wiring electrode array, improving touch sensitivity, and increasing capacitor density.

In preferred embodiments of the present disclosure, a capacitor cell generally has a rectangular or squares shape, and may be composed of one sensing electrode and one driving electrode each having a zigzag-shaped or wave-shaped edge wherein the two electrodes are coupled to form the capacitor cell. A capacitor cell may also be composed of two sensing electrodes and two driving electrodes each having zigzag-shaped or wave-shaped edges and the four electrodes mesh, in an alternating manner, to form the capacitor cell.

An advantage of embodiments of the present disclosure is that after the touch screen is affixed to the LCD, since the wires of the wiring region are zigzag-shaped or wave-shaped, the touch screen will not have rainbow effects. This enhances the display effects of the touch screen.

Also, because the edges of the driving electrodes and the sensing electrodes are wave-shaped and zigzag-shaped, when the finger moves from a capacitor cell to an adjacent capacitor cell, the change of capacitance of the former decreases gradually while the change of capacitance of the latter increases gradually. The decrement amount and the increment amount have an approximately linear relationship, thereby achieving a good touch effect. Another benefit is that the single layer wiring electrode array provides simple fabrication process, low costs, and high touch sensing performance.

The inner portions of the sensing electrode and the driving electrode may include holes, thereby reducing the parasitic capacitance of thereof and improving the touch sensitivity.

Bridging between the electrodes is not required in the fabrication of the single layer wiring electrode array, thereby simplifying the process flow.

The IC in the touch screen can detect tiny variations of capacitance and charge from the noises, compensate various parasitic effects, reduce interference, calculate precise touch position, and recognize gestures.

The electrode array in the touch screen can be adapted to different sizes of capacitive touch screens, including small, middle and large sizes, thereby meeting various requirements in production.

DETAILED DESCRIPTION OF THE EMBODIMENTS

Figure 1:
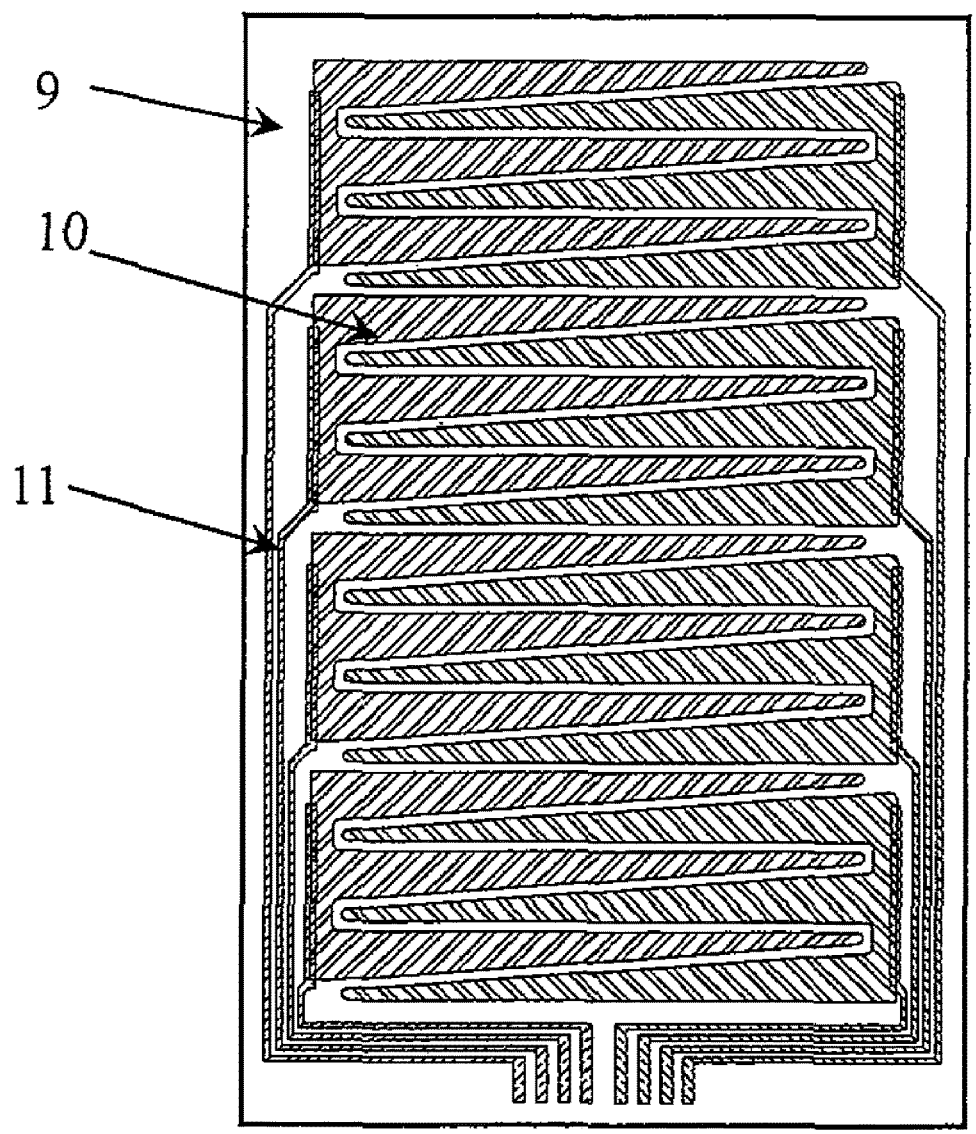
FIG. 1 is a schematic view of a single layer wiring electrode array in the prior art.

The technical solutions for achieving various objectives in the present disclosure are further described below with reference to the accompanying drawings and the embodiments of the present disclosure.

The present disclosure provides a single layer wiring electrode array. This single layer wiring electrode array includes capacitive regions and wiring regions located on one plane, wherein wires in the wiring regions are zigzag-shaped or wave-shaped.

In an embodiment of the present disclosure, the capacitive regions and the wiring regions are arranged in an alternating manner. The capacitive regions each include sequentially arranged capacitor cells and each capacitor cell includes at least one sensing electrode and at least one driving electrode disposed opposite to the sensing electrode on one plane.

In a preferred embodiment, inner portions of the sensing electrode and the driving electrode include holes for reducing parasitic capacitance.

In another preferred embodiment, the wiring regions include driving wires connected to multiple driving electrodes in parallel and a sensing wire that connects multiple sensing electrodes in series.

In embodiments, the sensing electrode has a zigzag-shaped or wave-shaped edge, the driving electrode has a zigzag-shaped or wave-shaped edge, and the two edges run parallel to each other. A plurality of sensing electrodes fits into wave-shaped or zigzag-shaped grooves formed by a plurality of driving electrodes, and the plurality of driving electrodes fits into wave-shaped or zigzag-shaped grooves formed by the plurality of sensing electrodes.

Further, the sensing electrodes of the capacitor cells are arranged in parallel and are connected in series through sensing wires at one side of the sensing electrodes, thereby forming a plurality of sensing electrode columns. The plurality of sensing electrode columns is arranged in parallel to form a sensing electrode plane. The driving electrodes of the capacitor cells are arranged in parallel and are connected in parallel through driving wires at one side of the driving electrodes, thereby forming a plurality of driving electrode columns. The plurality of driving electrode columns is arranged in parallel to form a driving electrode plane.

In a preferred embodiment, two adjacent turns of the sensing wire form an angle that ranges from 10° to 170°. More preferably, two adjacent turns of the sensing wire form an angle that ranges from 100° to 140°.

In an embodiment, two adjacent turns of the driving wire form an angle that ranges from 10° to 170°. More preferably, two adjacent turns of the driving wire form an angle that ranges from 100° to 140°. The sensing electrode includes zigzag-shaped or wave-shaped grooves having first inner angles ranging from 10° to 170° and the driving electrode includes zigzag-shaped or wave-shaped grooves having second inner angles ranging from 10° to 170°. More preferably, the sensing electrode includes zigzag-shaped or wave-shaped grooves having first inner angles ranging from 100° to 140° and the driving electrode includes zigzag-shaped or wave-shaped grooves having second inner angles ranging from 100° to 140°.

In an exemplary embodiment, a line width of the sensing wire ranges from 0.001 to 10 millimeter (mm), a width of the sensing electrode ranges from 0.005 to 10 mm, a line width of the driving wire ranges from 0.001 to 10 mm, a width of the driving electrode ranges from 0.005 to 10 mm, a space between adjacent driving wires ranges from 0.001 to 5 mm, a distance between the wave-shaped or zigzag-shaped edges of the sensing electrode and the adjacent driving electrode ranges from 0.001 to 5 mm, a length of the capacitor cell may range from 1 to 15 mm, and a width of the capacitor cell may range from 1 to 15 mm.

In a preferred embodiment, the wiring regions further include a separation wire located between the sensing wire and the driving wires. To further this embodiment, the separation wire may be wave-shaped or zigzag-shaped and is parallel to an edge of the sensing wire and an edge of one of the driving wires. A line width of the separation wire ranges from 0.005 to 10 mm and a distance between an edge of the separation wire and a wave-shaped or zigzag-shaped edge of the driving wire or the sensing wire ranges from 0.001 to 10 mm.

In other embodiments, the separation wire includes zigzag-shaped or wave-shaped grooves having inner angles ranging from 10° to 170°. More preferably, the separation wire includes zigzag-shaped or wave-shaped grooves having inner angles ranging from 40° to 140°.

In various embodiments, the sensing electrode and the driving electrode may be made of an ITO film, a transparent conductive metal film, or a conductive metal film.

A capacitive touch screen constructed according to the present disclosure includes a substrate and a single layer wiring electrode array disposed over the substrate. The single layer wiring electrode array includes capacitive regions and wiring regions located on one plane and wires in the wiring regions are zigzag-shaped or wave-shaped. The capacitive touch screen further includes control ports for connecting to one or more integrated circuits (IC), wherein the wires in the wiring regions are connected to the control ports respectively.

In an embodiment, the capacitive touch screen further includes a ground wire connected to one of the control ports for connecting to the IC. The substrate may be made of: glass, toughened glass, tempered glass, or polyethylene terephthalate (PET). In a preferred embodiment, the ground wire is wave-shaped or zigzag-shaped.

In a preferred embodiment, an upper portion of the driving wires is connected to control ports corresponding to an IC, while a lower portion thereof is connected to control ports corresponding to another IC.

As shown in the Background section of the present disclosure, existing capacitive touch screens may exhibit rainbow effects when affixed to LCDs due to the methods of routing wires thereof.

The electrodes of the capacitive touch screen of the present disclosure may be in one or more of the following shapes: a rectangle, a square, a parallelogram, a diamond, a trapezoid, a hexagon, an octagon, a circle, an ellipse, a triangle, and a combination thereof. The improvements upon existing arts provided by the present disclosure include a change in the wire shape of the wiring region. Preferably, the wires in the wiring regions are zigzag-shaped or wave-shaped. The zigzag-shaped or wave-shaped wires in the wiring regions can eliminate the rainbow effects in the display. It is known to persons with ordinary skill in the art that any capacitive touch screen with wires in the wiring region having identical or similar shape of the wires in the present disclosure, and any improvements made thereto, fall within the scope of the present disclosure.

An objective of embodiments of the present disclosure is to improve clarity and display effects upon existing touch screens. The following section describes the specific embodiments of the present disclosure in more details in conjunction with the accompanying drawings.

Figure 2:
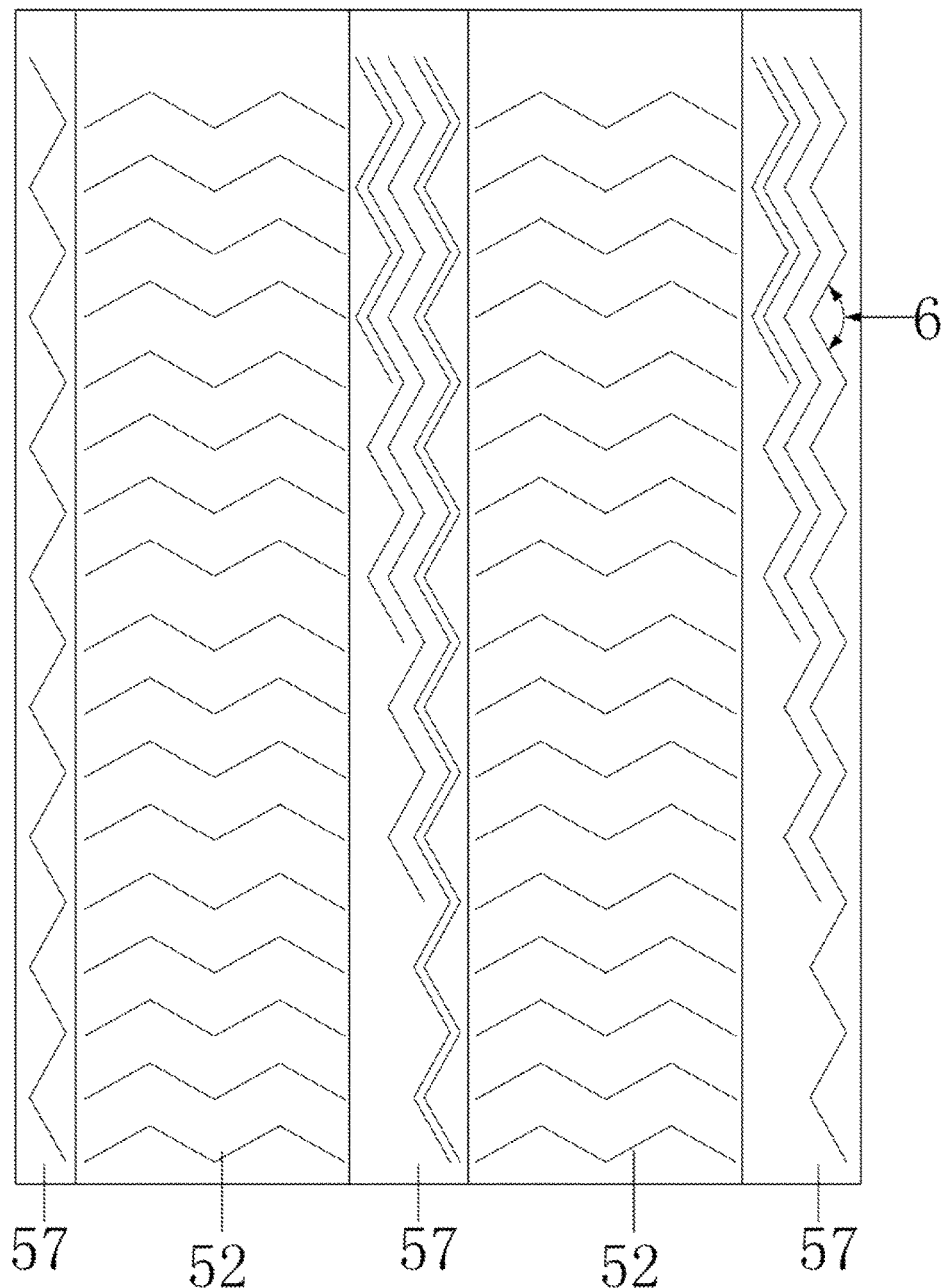
FIG. 2 is a schematic view of a single layer wiring electrode array in an embodiment of the present disclosure.

FIG. 2 is a schematic view of a single layer wiring electrode array in an embodiment of the present disclosure. As shown in FIG. 2, the electrode array includes capacitive regions 52 and wiring regions 57, which are arranged in an alternating manner. The wires in the wiring region 57 are zigzag-shaped and parallel to each other. In other embodiments, the wires of the wiring regions may be wave-shaped. Further, the wires may not be parallel in some embodiments. This embodiment only illustrates the position and shapes of the capacitive regions 52 and the wiring regions 57 by way of an example. It is not intended to show the actual connections between the electrodes in the capacitive region 52 and the wires in the wiring region 57. Therefore, the number of the wires in the wiring region 57, the number of the electrodes in the capacitive region 52, and the connection between the wires in the wiring region 57 and the electrodes in the capacitive region 52 as shown FIG. 2 do not limit the scope of the present disclosure beyond what is recited in the claims. In FIG. 2, an inner angle 6 of the zigzag-shaped edge of the wire in the wiring region 57 is 130°, wherein the inner angle 6 is formed by two straight lines extending through the adjacent two turns of the zigzag-shaped wire. In other embodiments, this inner angle 6 may be 10°-170°, or 100°-140°. The wires in the wiring region 57 are arranged vertically, and may be arranged horizontally, as well as obliquely. The line width of the wires in the wiring region 57 and the space between the adjacent wires may be fixed values. In other embodiments, the line width of the wires in the wiring region 57 and the space between the adjacent wires may vary. For example, the line widths of the wires may increase gradually from left to right or from top to bottom. The space between the wires may increase gradually from top to bottom or from left to right.

Figure 3:
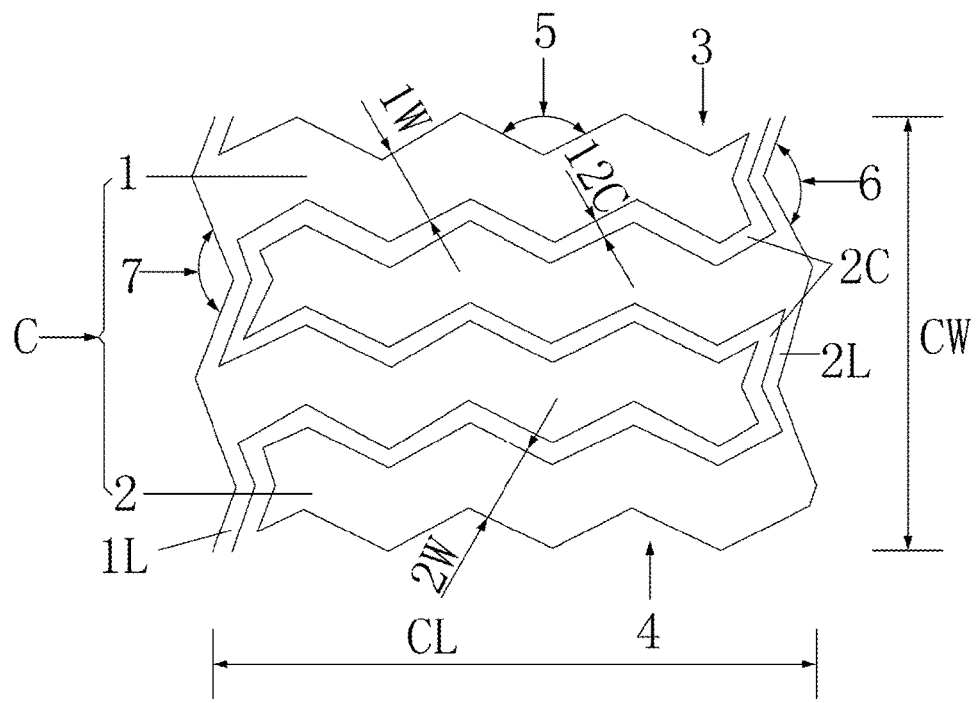
FIG. 3 is a structural view of a single layer wiring electrode array in an embodiment of the present disclosure.

FIG. 3 is a structural view of a single layer wiring electrode array in an embodiment of the present disclosure. As shown in FIG. 3, the sensing electrodes 1 and the driving electrodes 2 are located on the same plane. The sensing electrodes 1 fit into the zigzag-shaped grooves 2C formed by the driving electrodes 2 in an alternating manner, while the driving electrodes 2 fit into the zigzag-shaped grooves 2C formed by the sensing electrodes 1 in an alternating manner. The sensing electrodes 1 and the driving electrodes 2 form a capacitor cell C. In FIG. 3, the capacitor cell C includes two sensing electrodes 1 and two driving electrodes 2 and the capacitive region includes one capacitor cell C. Persons with ordinary skill in the art should understand that in other embodiments, the capacitor cell C may be composed of two sensing electrodes 1 and one driving electrode 2; one sensing electrode 1 and two driving electrodes 2; one sensing electrode 1 and one driving electrode 2; or other numbers of sensing electrodes 1 and driving electrodes 2. The capacitor cell C is substantially a rectangle or a square, and the inner portion thereof is provided with zigzag-shaped or wave-shaped grooves 2C formed by the driving electrodes 2. The wave-shaped or zigzag-shaped edges of the sensing electrodes 1 and the wave-shaped or zigzag-shaped edges of the driving electrodes 2 run parallel to each other with a certain gap. The adjacent driving electrode 2 and sensing electrode 1 form a capacitor, which improves the touch sensitivity. Even though other embodiments of the electrode array may also be illustrated with one capacitor cell in the drawings, it should be understood that the electrode array may be composed of 23×12 capacitor cells, and may also be composed of any number of capacitor cells according to different sizes of the touch screens. Two sensing electrodes 1 are connected in series into a sensing electrode column 3 through a sensing wire 1L at the left side of the sensing electrodes 1, wherein the line width of the sensing wire 1L is 1 mm. Two driving electrodes 2 are connected into a driving electrode column 4 through a driving wire 2L at the right side of the driving electrodes, wherein the line width of the driving wire 2L is 0.05 mm. The sensing wire 1L and the driving wire 2L form the wiring region. The sensing wire 1L and the driving wire 2L are zigzag-shaped. An inner angle 7 of the zigzag-shaped edge of the sensing wire 1L is 120°, and an inner angle 6 of the zigzag-shaped edge of the driving wire 2L is 120°, wherein the inner angles 6 and 7 are each formed by two straight lines extending through the adjacent two turns of the respective zigzag-shaped wires. The capacitive region and the wiring region are arranged in an alternating manner. In other embodiments, multiple sensing electrode columns are arranged in parallel to form a sensing electrode plane, and multiple driving electrode columns are arranged in parallel to form a driving electrode plane. The edges of the sensing electrodes 1 and the driving electrodes 2 are zigzag-shaped, wherein an inner angle 5 of the zigzag-shaped groove formed by the sensing electrode 1 and the driving electrode 2 is 120°. It is known to persons having ordinary skill in the art that the edges of the sensing electrodes 1 and the driving electrodes 2 may also be wave-shaped. The edges of the sensing electrodes 1 and the driving electrodes 2 are parallel to each other in a wave pattern or a zigzag pattern. When a finger moves from a capacitor cell C to an adjacent capacitor cell C, the change of capacitance of the former decreases gradually while the change of capacitance of the latter increases gradually. The amount of decrement and the amount of increment have an approximately linear relationship. Accordingly, the touch scenario can be determined to achieve good touch effects. The sensing electrodes 1 and the driving electrodes 2 are disposed opposite to each other thereby forming a complementary pattern. The edges of the driving electrodes 2 and the edges of the sensing electrodes 1 are parallel to each other and a distance 12C between the adjacent edges thereof is 0.03 mm.

In an exemplary embodiment, a horizontal length CL of the capacitor cell C is 8 mm and a width CW is 6 mm. A width 1W between two parallel edges of the sensing electrode 1 is 1.2 mm. A width 2W between two parallel edges of the driving electrode 2 is 1.2 mm.

In this embodiment, the sensing electrodes 1 and the driving electrodes 2 are made of ITO films. In other embodiments, the sensing electrodes 1 and the driving electrodes 2 may also be made of transparent conductive metal films. It is known to persons having ordinary skill in the art that the accompanying drawings are not drawn to scale and are merely simplified drawings showing the various diagrammatic features of the present disclosure. The specific features of the present disclosure disclosed herein, such as the specific size, direction, position and shape, may be partially determined by the actual application environment. In other embodiments, the distance between the wave-shaped or zigzag-shaped edge of the sensing electrode and the wave-shaped or zigzag-shaped edge of the adjacent driving electrode is 0.001-5 mm. The length of the capacitor cell may be 1-15 mm. The width of the capacitor cell may be 1-15 mm. The width of the sensing electrode may be 0.005-10 mm. The line width of the sensing wire may be 0.001-10 mm. The line width of the driving wire may be 0.001-10 mm. The width of the driving electrode may be 0.005-10 mm. The space between multiple driving wires may be 0.001-5 mm. The inner angle of the zigzag-shaped groove or the inner angle between the tangential directions of the wave-shaped groove formed by the sensing electrode and the driving electrode is 10°-170°, preferably 30°-150°, and more preferably 40°-140°. The inner angle of the zigzag-shaped edge or the inner angle of the wave-shaped edge in the tangential directions of the sensing wire is 10°-170°. The inner angle of the zigzag-shaped edge or the inner angle of the wave-shaped edge in the tangential direction of the driving wire is 10°-170°. Preferably, the inner angle of the zigzag-shaped edges or the inner angle of the wave-shaped edges in the tangential direction of the sensing wire and the driving wire are 100°-140°.

Figure 4:
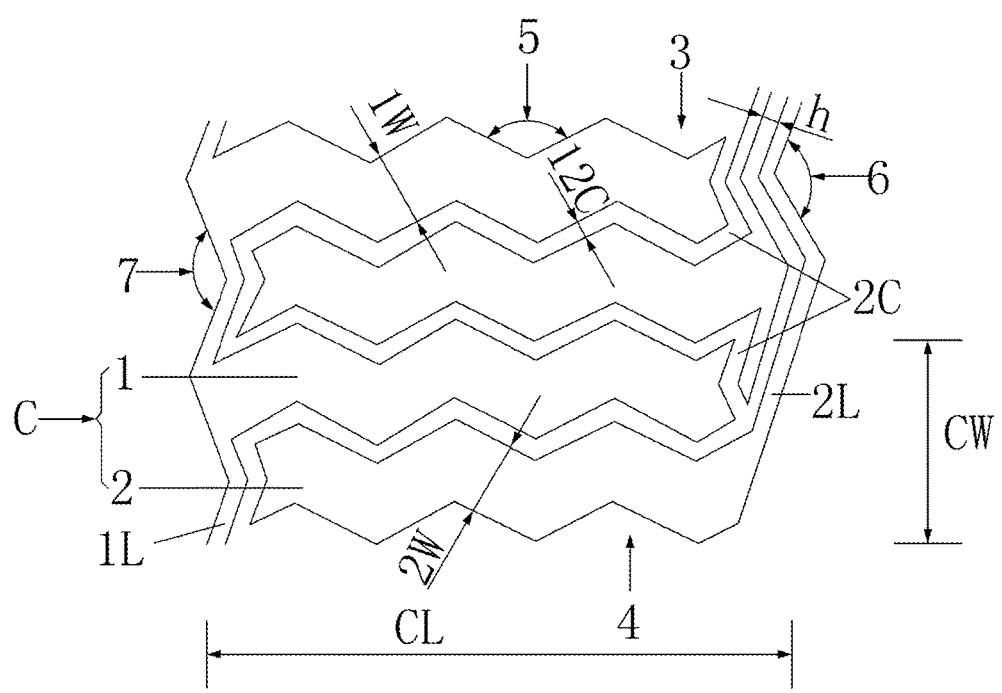
FIG. 4 is a structural view of a first variation of the single layer wiring electrode array in an embodiment of the present disclosure.

FIG. 4 is a schematic view of a first variation of the single layer wiring electrode array in an embodiment of the present disclosure. Differences between this embodiment and the first embodiment include: the capacitor cell C of this embodiment is composed of one sensing electrode 1 and one driving electrode 2, and two driving electrodes 2 are connected in parallel to the driving wires 2L at the right side of the driving electrode. The space h between the driving wires 2L is 0.05 mm. In other embodiments, the space between the driving wires is 0.001-5 mm.

Figure 5:
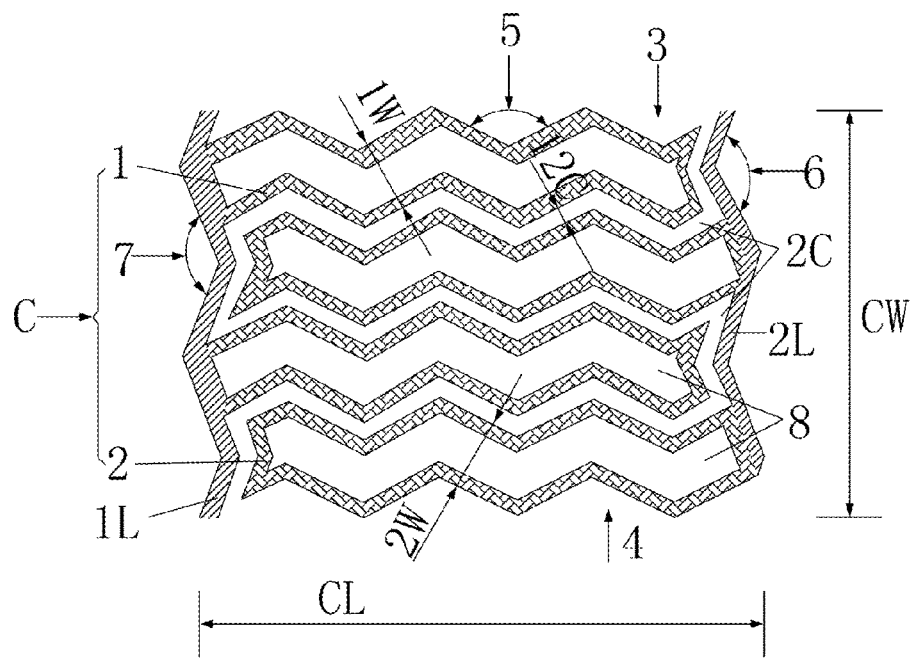
FIG. 5 is a structural view of a second variation of the single layer wiring electrode array in an embodiment of the present disclosure.

FIG. 5 is a schematic view of a second variation of the single layer wiring electrode array in an embodiment of the present disclosure. A difference between this embodiment and the first embodiment is that the inner portion of the sensing electrode 1 and the driving electrode 2 are provided with holes 8. In this embodiment, the holes 8 have the same shape as those of the sensing electrode 1 and the driving electrode 2. In other embodiments, the holes 8 may also be a rectangle, a circle, an ellipse, a trapezoid, a parallelogram, and/or a combination thereof. It is also possible that only the inner portions of the sensing electrodes are provided with the holes, or only the inner portions of the driving electrodes are provided with the holes, either of which is within the scope of the present disclosure.

Figure 6:
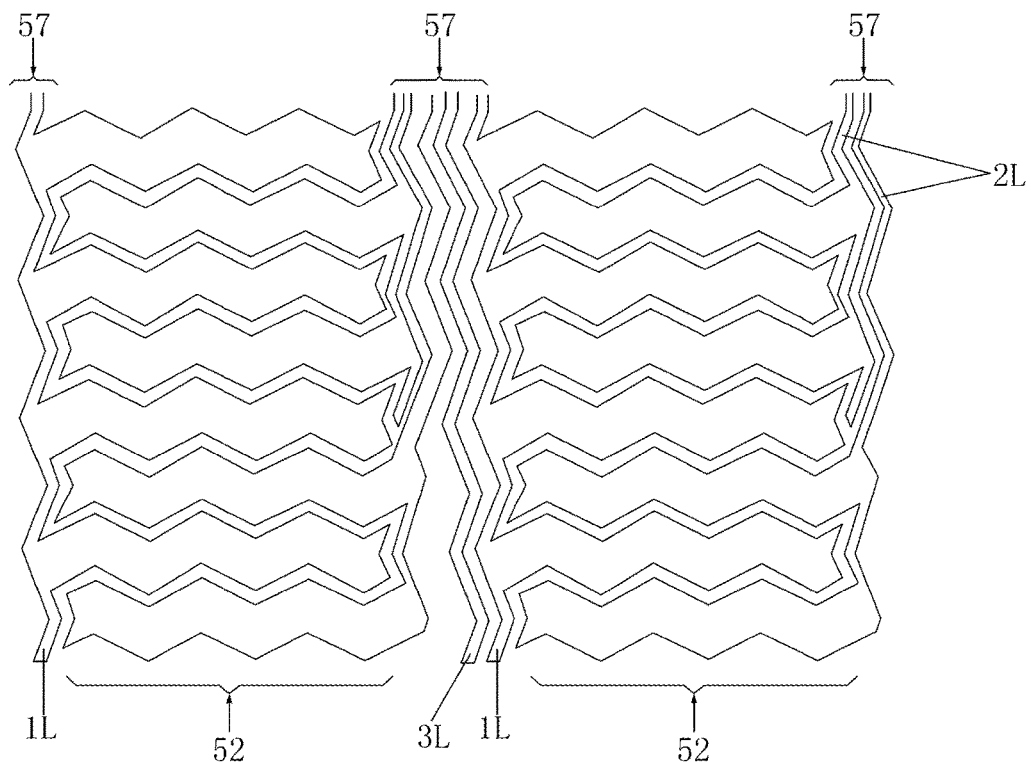
FIG. 6 is a structural view of a third variation of the single layer wiring electrode array in an embodiment of the present disclosure.

FIG. 6 is a schematic view of a third variation of the single layer wiring electrode array in an embodiment of the present disclosure. One difference between this embodiment and the first embodiment is that FIG. 6 shows a 2×2 electrode array. The electrode array includes capacitive regions 52 and wiring regions 57. The capacitive regions 52 and the wiring regions 57 are arranged in an alternating manner. The wiring region 57 includes a sensing wire 1L and driving wires 2L, and further includes a separation wire 3L disposed between the sensing wire 1L and the driving wires 2L. The line width of the driving wire 2L in the wiring region 57 decreases gradually from bottom to top. The space between the driving wires 2L decreases gradually from bottom to top. The space between the driving wires is 0001-5.0 mm. The width of the driving electrode is 0.005-10 mm. The separation wire 3L is zigzag-shaped and parallel to the edges of the sensing wire 1L and the driving wires 2L. An inner angle of a zigzag-shaped groove formed by the separation wire 3L is 120°. It is known to persons having ordinary skill in the art that the inner angle of the zigzag-shaped groove formed by the separation wire 3L may be of any value in the range of 10°-170°, and preferably in the range of 40°-140°. In other embodiments, the separation wire 3L is wave-shaped. An inner angle between the tangential directions of the wave-shaped groove of the separation wire 3L is 10°-170°. The line width of the separation wire 3L is 0.05 mm, and a distance between the edge of the separation wire 3L and the zigzag-shaped edge of the driving wire 2L or the sensing wire 1L is 0.05 mm. In this embodiment, the line width of the sensing wire remains constant. In other embodiments, the line width of the sensing wire may vary. The distance between the driving wires and the width of the driving electrode may each be a fixed value. In other embodiments, the line width of the separation wire may be of any value in the range of 0.005-10 mm. The distance between the edge of the separation wire and the wave-shaped or zigzag-shaped edge of the driving wire or the sensing wire may be of any value in the range of 0.001-10 mm.

Figure 7:
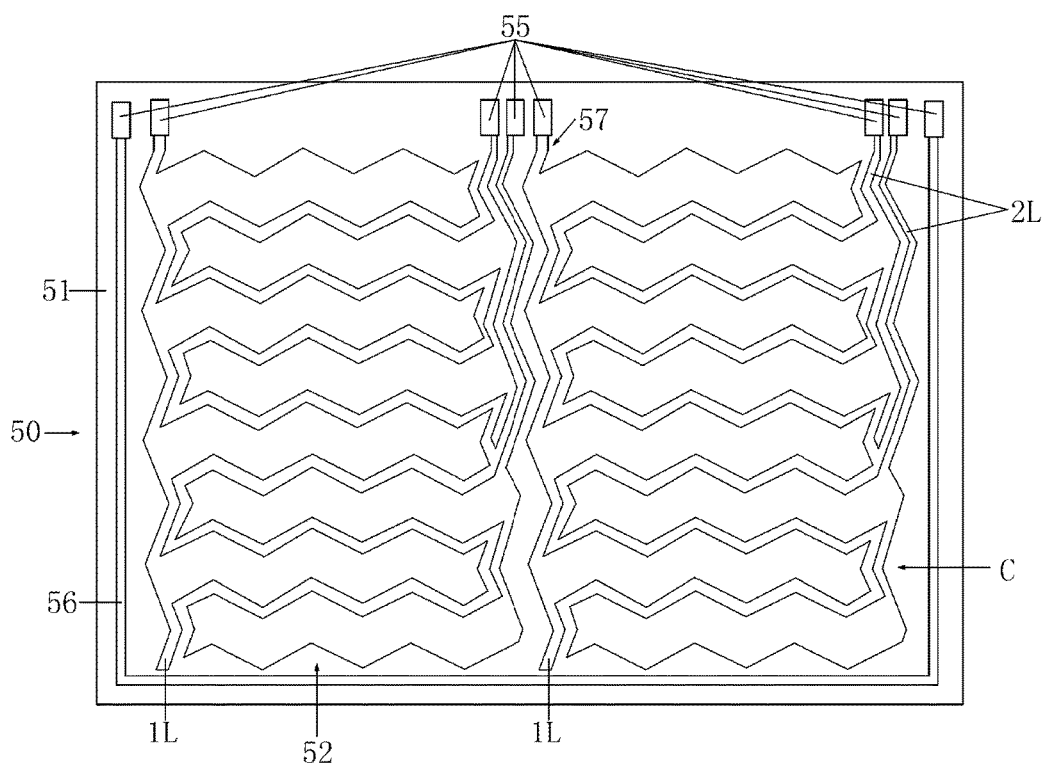
FIG. 7 is a schematic view of a capacitive touch screen in an embodiment of the present disclosure.

FIG. 7 is a schematic view of a capacitive touch screen in a first embodiment of the present disclosure. As shown in FIG. 7, a capacitive touch screen 50 includes a substrate 51, and capacitive regions 52 and wiring regions 57 disposed over the substrate 51. In this embodiment, capacitor cells C in a 2×2 array form an electrode array 52. This is merely an example for illustration purposes. It can be understood that in an actual implementation, the electrode array 52 may be a 10×15 electrode array, a 20×20 electrode array, a 23×12 electrode array, or any capacitor cell array as needed. In the electrode array 52, the sensing wire 1L is connected to a control port 55 for connecting to an integrated circuit (IC) (not shown), and the driving wire 2L is connected to a control port 55 for connecting to the IC (not shown). As shown, a sensing electrode column connected by a sensing wire 1L and the corresponding driving electrode column couple to form a capacitor cell column. Multiple capacitor cell columns are arranged into the electrode array 52. In the electrode array 52, the driving wire 2L of one of the capacitor cell columns and the sensing wire 1L of an adjacent capacitor cell column are located in the wiring region 57 between the two adjacent capacitor cell columns. In this embodiment, the number of the control ports 55 merely illustrates exemplary connections to the sensing wire 1L and the driving wire 2L. Persons having ordinary skill in the art should understand that the IC may have more control ports or different numbers of control ports for different electrode arrays. The capacitive touch screen 50 further includes a ground wire 56 connected to corresponding control ports in the IC. In embodiments, the substrate 51 may be glass, toughened glass, or tempered glass. The substrate 51 may be a rectangle, a square, a circle, or a combination thereof, and may have a curved surface.

Figure 8:
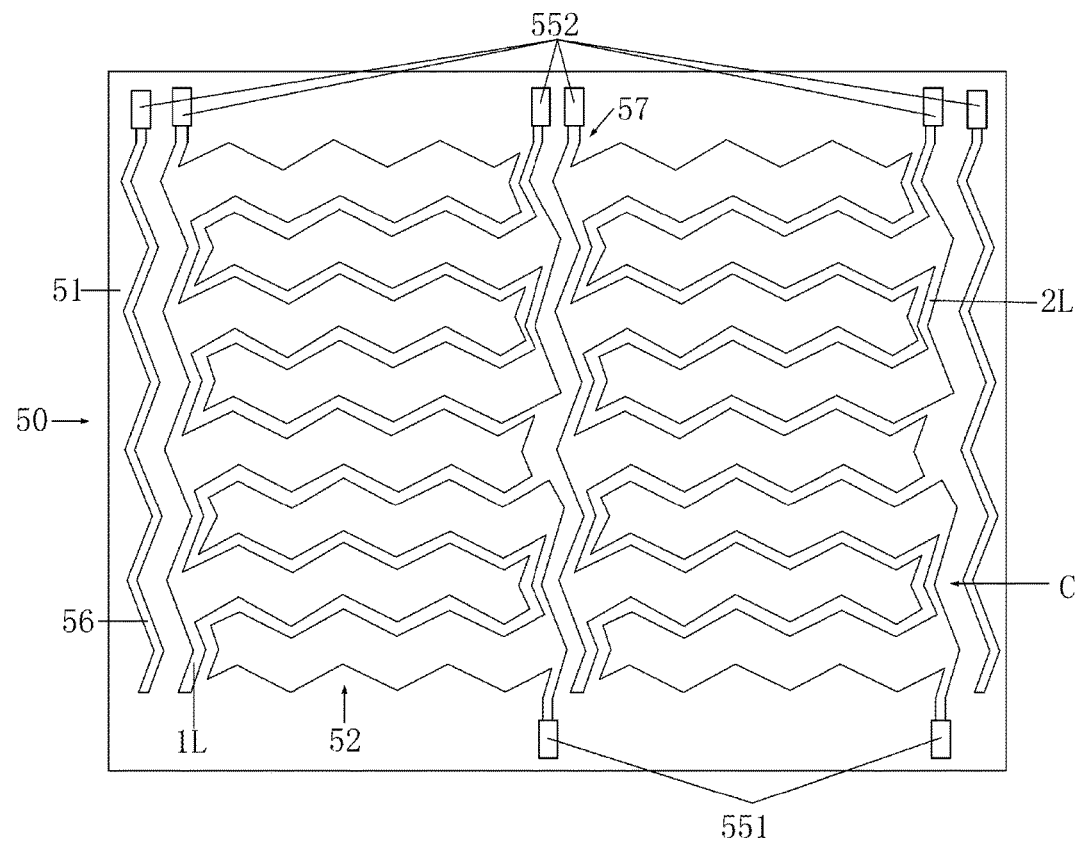
FIG. 8 is a schematic view of a variation of the capacitive touch screen in an embodiment of the present disclosure.

FIG. 8 is a schematic view of a variation of the capacitive touch screen in an embodiment of the present disclosure. As shown in FIG. 8, one difference between this embodiment and the first embodiment is that the upper portion and lower portion of the substrate 51 are respectively provided with control ports 552 and 551 for connecting to one or more ICs (not shown). The driving wires 2L are separately connected to the control port 551 or 552. That is, the upper portion of the driving wires 2L is connected to the control portion 552 and the lower portion thereof is connected to the control port 551. Control ports 552 and 551 may connect to different control ports of the same IC, or may connect to control ports on two identical ICs. One benefit of such scheme is that it reduces the space occupied by the driving wires 2L, thus reducing the area of the wiring region 57 in the electrode array 52. This improves both the sensitivity and the density of the electrode array. The ground wire 56 is zigzag-shaped and runs parallel to the edges of the sensing wire 1L and the driving wire 2L. An inner angle of a zigzag-shaped groove formed by the ground wire 56 is 120°. The line width of the ground wire 56 is 0.05 mm. In other embodiments, the ground wire 56 may be wave-shaped, and an inner angle between the tangential directions of a wave-shaped groove formed by the ground wire is of any value in the range of 10°-170°. In implementations, the inner angle of the zigzag-shaped groove and the inner angle between the tangential directions of the wave-shaped groove formed by the separation wire may preferably be 40°-140°. The line width of the ground wire may be 0.005-10 mm.

The aforementioned embodiments are used for illustrating the principles and benefits of the present disclosure, but do not limit the present disclosure. Persons having ordinary skill in the art may make various changes herein without departing from the spirit and scope of the present disclosure. Accordingly, it is appropriate that the appended claims be construed broadly and in a manner consistent with the present disclosure.

What is claimed is:

1. An apparatus for use in a touch sensing device, comprising:
   a conductive layer having capacitive regions and wiring regions located on one plane and arranged in an alternating manner;
   at least one capacitor cell in each of the capacitive regions; and
   at least one wire in each of the wiring regions,
   wherein:
   each of the capacitor cells includes a driving electrode and a sensing electrode adjacent to the driving electrode;
   each of the driving and sensing electrodes has at least two sides that are zigzag-shaped or wave-shaped;
   the wires are curved;
   at least one of the driving and sensing electrodes includes a hole within the one of the driving and sensing electrodes; and
   one of the capacitor cells includes a first plurality of driving electrodes and a second plurality of sensing electrodes.

2. The apparatus of claim 1, wherein one of the capacitor cells includes a driving electrode having a hole and a sensing electrode having a hole.

3. The apparatus of claim 1, wherein the hole has at least two edges that are zigzag-shaped or wave-shaped.

4. The apparatus of claim 1, wherein two edges of the hole are parallel to two sides of the at least one of the driving and sensing electrodes.

5. The apparatus of claim 1, wherein:
   a first side of the driving electrode is zigzag-shaped or wave-shaped;
   a second side of the sensing electrode is zigzag-shaped or wave-shaped; and
   the first and second sides are parallel to each other.

6. The apparatus of claim 1, wherein:
   the first plurality fits into grooves formed by the second plurality;
   the second plurality fits into grooves formed by the first plurality; and
   each of the first and second pluralities includes a hole within the respective electrode.

7. The apparatus of claim 1, wherein one of the wiring regions includes a separation wire that is not connected to any electrode for driving or sensing.

8. The apparatus of claim 7, wherein the one of the wiring regions further includes second wires connected to multiple driving electrodes in parallel and a first wire that connects multiple sensing electrodes in series, wherein the separation wire is located between the first wire and the second wires.

9. An apparatus for use in a touch sensing device, comprising:
   a conductive layer having capacitive regions and wiring regions arranged in an alternating manner;
   at least one capacitor cell in each of the capacitive regions; and
   at least one wire in each of the wiring regions, wherein:
   each of the capacitor cells includes a driving electrode and a sensing electrode adjacent to the driving electrode;
   each of the driving and sensing electrodes has at least two sides that are zigzag-shaped or wave-shaped;
   the wires are curved; and
   one of the capacitor cells includes a first plurality of driving electrodes and a second plurality of sensing electrodes.

10. The apparatus of claim 9, wherein the first plurality fits into grooves formed by the second plurality and the second plurality fits into grooves formed by the first plurality.

11. The apparatus of claim 9, wherein each of the first and second pluralities includes a hole within the respective electrode.

12. The apparatus of claim 11, wherein the hole has at least two edges that are zigzag-shaped or wave-shaped.

13. The apparatus of claim 9, wherein one of the wiring regions includes a first wire connected to a sensing electrode of the one of the capacitor cells and a second wire connected to a driving electrode of another one of the capacitor cells.

14. The apparatus of claim 13, wherein the one of the wiring regions further includes a third wire between the first wire and the second wire.

15. A capacitive touch screen, comprising:
    a substrate; and
    a single layer wiring electrode array disposed over the substrate,
    wherein the single layer wiring electrode array includes capacitive regions and wiring regions arranged in an alternating manner, and further includes at least one capacitor cell in each of the capacitive regions and at least one wire in each of the wiring regions,
    wherein each of the capacitor cells includes a driving electrode and a sensing electrode adjacent to the driving electrode, and each of the driving and sensing electrodes has at least two sides that are zigzag-shaped or wave-shaped, and the wires are curved,
    wherein one of the wiring regions includes a first wire connected to a sensing electrode and a second wire connected to a driving electrode.

16. The capacitive touch screen of claim 15, further comprising:
    control ports for connecting to at least one integrated circuit (IC), wherein the first and second wires are connected to two of the control ports, respectively.

17. The capacitive touch screen of claim 16, wherein the two of the control ports are located on opposite sides of the single layer wiring electrode array.

18. The capacitive touch screen of claim 16, wherein the two of the control ports are located on a same side of the single layer wiring electrode array.

19. The capacitive touch screen of claim 16, wherein the one of the wiring regions further includes a third wire between the first wire and the second wire.

20. The capacitive touch screen of claim 15, wherein one of the capacitor cells includes a driving electrode having a hole inside the driving electrode and a sensing electrode having a hole inside the sensing electrode.

* * * * *